United States Patent [19]
O'Malley et al.

[11] Patent Number: 6,152,299
[45] Date of Patent: Nov. 28, 2000

[54] REUSABLE DISPLAY PACKAGE FOR SHANKED TOOL OR OTHER DISPLAY ITEM

[75] Inventors: Gina O'Malley, Phoenix; Daniel G. Findle, White Hall, both of Md.; David A. Evans, Sr., Hanover, Pa.

[73] Assignee: Black & Decker Inc., Newark, Del.

[21] Appl. No.: 09/304,440

[22] Filed: May 3, 1999

[51] Int. Cl.⁷ ................................................... B65D 85/00
[52] U.S. Cl. ........................... 206/349; 206/471; 206/776
[58] Field of Search ..................................... 206/736, 747, 206/752, 759, 349, 372, 373, 775, 776, 778, 461, 467, 469, 470, 471

[56] References Cited

U.S. PATENT DOCUMENTS

| | | |
|---|---|---|
| 1,500,136 | 7/1924 | Knowlton . |
| 1,585,846 | 5/1926 | Frisbie . |
| 2,950,004 | 8/1960 | Acomb . |
| 3,109,539 | 11/1963 | Turoff . |
| 3,534,358 | 10/1970 | Stern . |
| 3,776,375 | 12/1973 | Rohdin . |
| 3,825,112 | 7/1974 | Shumaker et al. . |
| 3,899,100 | 8/1975 | Rigaud . |
| 3,949,872 | 4/1976 | Paudras . |
| 4,005,776 | 2/1977 | Seeley . |
| 4,020,694 | 5/1977 | Mayhew . |
| 4,084,690 | 4/1978 | Pulse . |
| 4,324,331 | 4/1982 | Ignasiak . |
| 4,449,629 | 5/1984 | Barrieau . |
| 4,499,353 | 2/1985 | Shields . |
| 4,588,082 | 5/1986 | Ridings . |
| 4,619,364 | 10/1986 | Czopor, Jr. . |
| 4,687,129 | 8/1987 | Cugley . |
| 4,702,373 | 10/1987 | Meade . |
| 4,877,130 | 10/1989 | Matuz . |
| 4,903,829 | 2/1990 | Clemens . |
| 4,921,096 | 5/1990 | McFarlane . |
| 5,133,454 | 7/1992 | Hammer . |
| 5,209,354 | 5/1993 | Thornhill et al. . |
| 5,238,107 | 8/1993 | Kownacki . |
| 5,322,162 | 6/1994 | Melk . |
| 5,456,057 | 10/1995 | Bannon et al. . |
| 5,586,657 | 12/1996 | Ward et al. . |
| 5,595,295 | 1/1997 | Lin . |
| 5,601,188 | 2/1997 | Dressen et al. . |
| 5,713,463 | 2/1998 | Lakoski et al. . |
| 5,823,350 | 10/1998 | Ward . |
| 5,871,100 | 2/1999 | Ward . |
| 5,878,886 | 3/1999 | Marshall . |

FOREIGN PATENT DOCUMENTS

| | | |
|---|---|---|
| 0 559 443 B1 | 8/1993 | European Pat. Off. . |
| 820419 | 11/1951 | Germany . |

*Primary Examiner*—Jacob K. Ackun
*Attorney, Agent, or Firm*—Harness, Dickey & Pierce, P.L.C.

[57] ABSTRACT

A reusable package is provided for displaying and storing a variety of different display items, such as shanked router bits or cutting bits. Front and rear body portions are hingedly interconnected and are foldable between closed and open positions. The body portions include dished "clam-shell" portions that are releasably and grippingly nestable with each other when the package is in its closed position. The front dished portion also includes a blister cavity display portion adapted to house a variety of different display items, and a recessed portion if the blister cavity releasably grips a shank or rod-like portion of the display item. Display insert cards, anti-theft security devices, or small accessories may be also housed between the front and rear dished portions. The front and rear body portions can be repeatedly closed and opened after a frangible initial attachment has been broken.

17 Claims, 3 Drawing Sheets

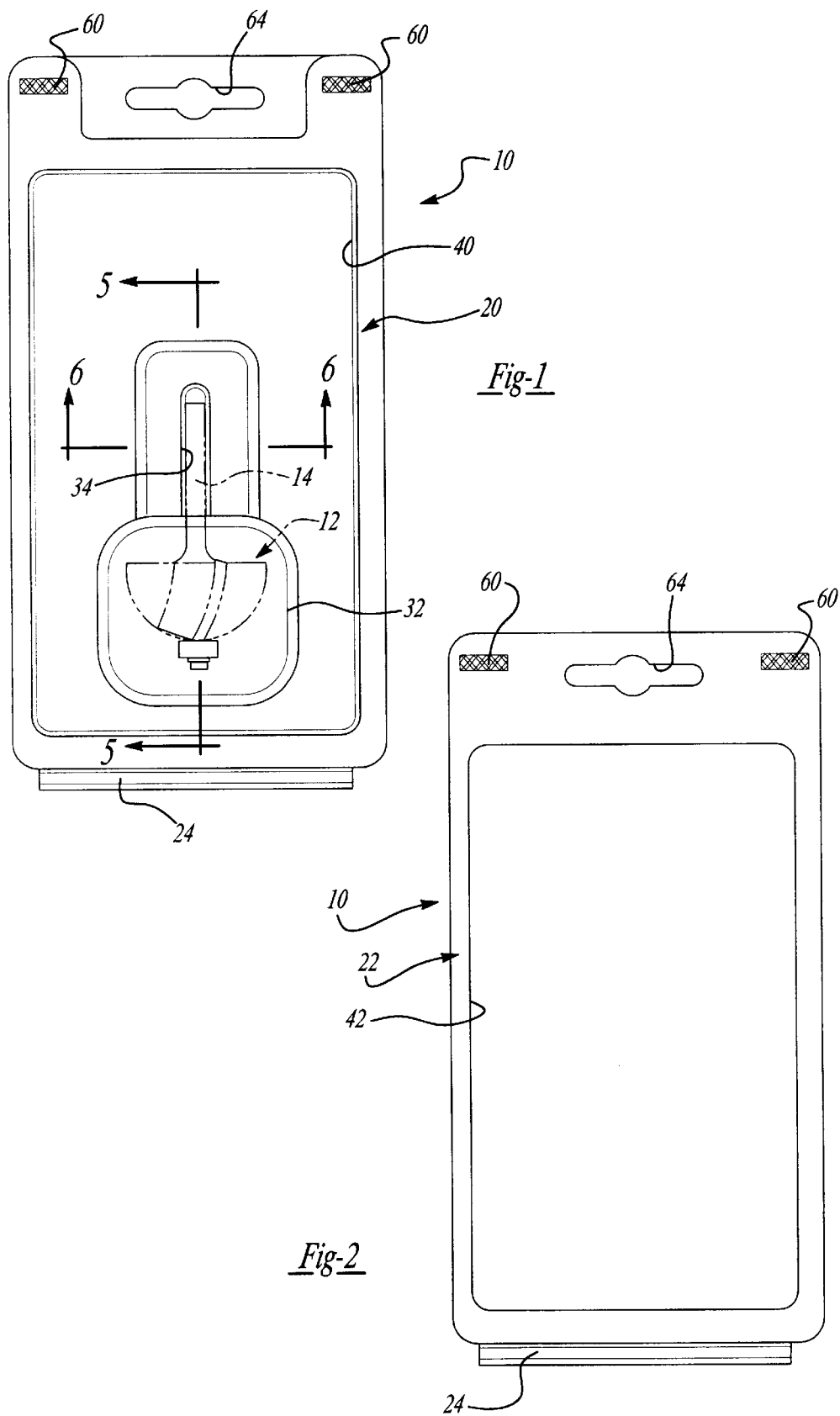

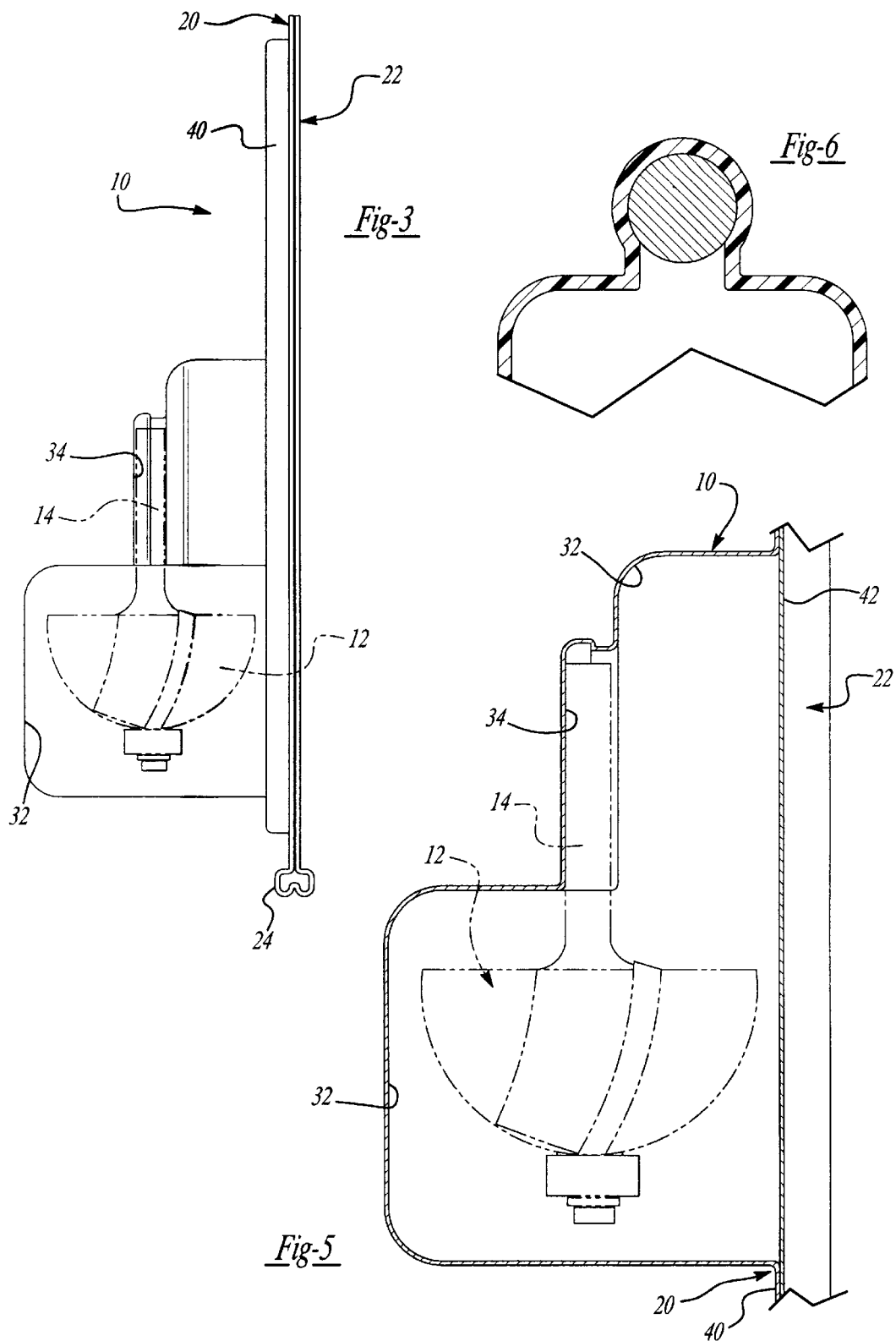

REUSABLE DISPLAY PACKAGE FOR SHANKED TOOL OR OTHER DISPLAY ITEM

BACKGROUND AND SUMMARY OF THE INVENTION

The invention relates generally to display packages for cutting tool bits, router bits, drill bits, driver bits or other similar products having an elongated rod-like shank portion, or other such display items. More particularly, the invention relates to such packages that are intended to be reused for storing or holding the tool or other item after being initially opened by the user.

This application is related to an application entitled "REUSABLE DISPLAY PACKAGE FOR CIRCULAR BLADE OR OTHER DISPLAY ITEM", filed of even date herewith.

Various packaging devices and arrangements for cutting tool bits, router bits or other similar display items have been provided in the past. Such previous packages include skin packs, blister packs, shrink-wrapped and card-mounted packages, as well as other similar arrangements. These packages have frequently been found to be difficult to open without destroying or severely damaging the packaging, thus rendering the package unusable for post-opening storage or carrying by the user. Such packages have also been expensive and wasteful and have often been composed of materials that are difficult or impossible to recycle. In addition, many of such previous packages have inhibited the viewer's ability to easily see and evaluate the product being displayed. Furthermore, such prior packages have often been dedicated packages usable with only one display item, thus requiring different display packages for each of a number of different display items, even though such display items are very similar to one another.

According to the present invention, a reusable package is provided for displaying, holding and/or storing a variety of different display items, such as router bits or cutting bits, for example. The preferred reusable package includes front and rear body portions hingedly interconnected with each other in order to be selectively foldable between a fully closed generally face-to-face position and a fully open separated position.

In a preferred form of the present invention, the front and rear body portions each include respective dished or recessed "clam-shell" portions of a complementary size and shape that are releasably and grippingly nestable with each other when the package is in its closed position. Preferably the front dished portion also includes a blister cavity display portion formed therein and protruding generally forwardly when the front and rear body portions are in the closed position. The blister display cavity is preferably adapted to house a variety of different display items. Display insert cards, anti-theft security devices, or small accessories, for example, may be housed between the front and rear dished portions.

The front and rear body portions are initially attached to each other (such as by ultrasonic welding for example) to secure them in their closed position with the display item disclosed therebetween. This initial attachment is frangible and easily broken by the user in order to allow the front and rear body portions to be unfolded from each other for initial removal of the display item. After such initial opening and removal, the above-described closure portions are grippingly and releasably nestable with each other, within and through the central aperture of the display item, in order to allow the front and rear body portions to be repeatedly and releasably secured in their closed position after the frangible initial attachment has been broken.

The blister cavity display portion includes an elongate retaining recess formed therein for grippingly and releasably receiving and retaining the shank or other rod-like portion of the bit, tool or other display item. The remainder of the display item is thus suspended within the blister cavity, preferably without contacting the inner walls of the blister cavity. This prevents or substantially minimizes rattles of the display item, stabilizes it and enhances the viewing of it during processing, shipment and display in a commercial establishment, as well as in a user's facility.

In addition, in the preferred form of the present invention, at least one hang-hole is provided through each of the front and rear body portions, with the hang-holes being aligned with each other when the package is in its closed position in order to allow the package to be hung on a peg, hook, nail, or other external protruding member.

Additional objects, advantages, and features of the present invention will become apparent from the following description and the appended claims, taken in conjunction with the accompanying drawings.

BRIEF DESCRIPTION OF THE DRAWINGS

FIG. 1 is a front elevation view of a reusable package according to the present invention shown in its closed configuration.

FIG. 2 is a rear elevation view of the reusable package shown in FIG. 1.

FIG. 3 is a side view of the reusable package of FIGS. 1 and 2.

FIG. 5 is a partial cross-sectional view, taken generally along the line 5—5 of FIG. 1.

FIG. 6 is a partial cross-sectional view taken generally along line 6—6 of FIG. 1.

DETAILED DESCRIPTION OF THE PREFERRED EMBODIMENTS

Figure 4:
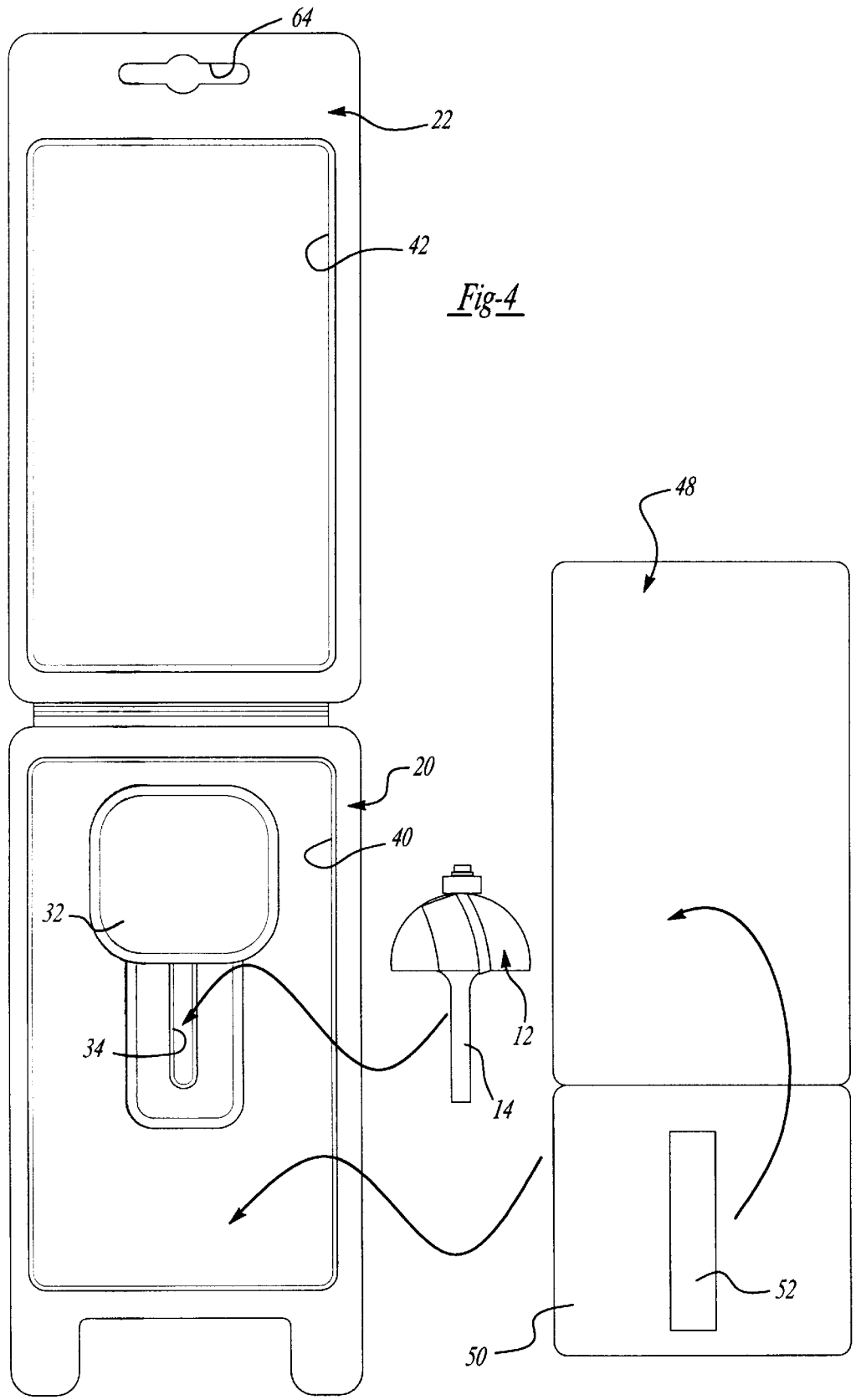
FIG. 4 is a partially exploded view of the preferred reusable display item according to the present invention, shown in its open configuration.

FIGS. 1 through 6 illustrate and depict one exemplary preferred embodiment according to the present invention, wherein a display package 10 is adapted for holding, storing and displaying a router bit 12 is illustrated. One skilled in the art will readily recognize that the reusable display package 10 is shown merely for purposes of example and that the principles of the present invention are equally applicable to display packages of other shapes, sizes and configurations than that shown in the drawings and, to such packages for display items other than router bits.

Referring to FIGS. 1 through 6, the exemplary reusable display package 10 is shown for displaying, holding and storing a router bit 12. The reusable display package 10 includes a front body portion 20 and a rear body portion 22 foldably interconnected by a living hinge 24 to allow the front and rear body portions 20 and 22 to be foldably opened and closed between the closed position shown in FIGS. 1 through 3, 5 and 6 and the open position shown in FIG. 4. Preferably, both of the front and rear body portions 20 and 22 are substantially transparent.

The front body portion 20 includes a blister cavity display portion 32, which protrudes generally outwardly from the inner to the outer side of the front body portion 20. The blister cavity display 32 includes a retaining recess 34 formed on its inner side for releasably receiving and retaining the shank 14 of the router bit 12, with the remainder of the router bit 12 being suspended within the lower portion of the blister cavity display 32, preferably out of contact with the inner side walls thereof. This allows the cutting portion of the router bit 12 to be easily viewable within the blister cavity display 32, while the retaining recess 34 substantially prevents or minimizes the router bit 12 from rattling within the package 10. This retention also stabilizes the router bit 12 during processing, shipment and display within a commercial establishment, as well as within the user's facility.

The front body portion 20 preferably includes a front dished portion 40 formed therein, and the rear body portion 22 has a similar rear dished portion 42 formed therein, with the "claim-shell" dished portions 40 and 42 both facing in the same direction when the display package 10 is in its closed position in order to releasably and grippingly nest within each other. One or more insert cards, shown in FIG. 4, can be housed between the nestable dished portions 40 and 42 and can include information about the router bit 12 or other display item printed thereon. The insert card 48 can also include a flap 50 fold downwardly against it. A magnetic or other similar anti-theft security device 52 can be concealed between the flap 50 and the remainder of the insert card 48. Arbor inserts or other thin accessories can also be housed between the dished portions 40 and 42.

As can be readily seen in FIGS. 1, 2 and 4, the front and rear body portions 20 and 22 include hang-holes 64 that are aligned with each other when the display package 10 is in its closed position, thus allowing the display package 10 to be hung on a peg, nail, hook or other external protruding member for display purposes in a commercial establishment as well as for storage and blade identification purposes by the user in his or her own facility.

Preferably the front and rear body portions 20 and 22 are initially secured to each other by frangible attachments 60, which can be ultrasonic welds or other such well-known attachments. These attachments 60, or the material around them, are designed to be easily broken by the user without destroying or unduly damaging the package 10. Thereafter, the display package 10 is reusable and repeatedly reclosable and reopenable as described above.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

We claim:

1. A reusable package adapted for displaying, holding and storing a display item having an enlarged portion and an elongated rod-like portion protruding therefrom, said package comprising a front body portion and a rear body portion each of which having inner and outer sides and being hingedly interconnected with each other in order to be selectively foldable relative to each other between a fully closed position with their respective inner sides in a generally face-to-face abutting relationship and a fully open position with their respective inner sides being separated and generally coplanar, at least said front body portion being at least partially transparent in order to allow a viewer to see the display item therethrough when the display item is disposed within said package, said front body portion having a blister cavity display portion formed therein and protruding generally outwardly from said inner to said outer sides thereof, said blister cavity display portion having an elongated retaining recess formed therein, said retaining recess grippingly and releasably receiving and retaining the rod-like portion of the display item with the enlarged portion of the display item being suspended therefrom and disposed with said blister cavity display portion when said package is being used for displaying, holding or storing the display item, said front body portion further includes a front dished portion formed therein and protruding generally forwardly from said inner to said outer sides thereof, said front dished portion being larger than and generally surrounding said blister display portion, said rear body portion having a rear dished portion formed therein and protruding generally forwardly when said front and rear body portions are in said closed position from said outer to said inner sides of said rear body portion, said rear dished portion being substantially flat and having a periphery that is complementary in size and shape with said front dished portion, said rear dished portion being grippingly and releasably nested within said front dished portion when said front and rear body portions are in their closed position.

2. A reusable package according to claim 1, wherein the display item is a tool item, the rod-like portion being a shank portion of the tool item.

3. A reusable package according to claim 2, wherein said shank portion is generally cylindrical.

4. A reusable package according to claim 2, wherein said shank portion is generally hex-shaped in lateral cross-section.

5. A reusable package according to claim 1, wherein the remainder of the display item is out of contact with said blister cavity display portion when it is suspended from its rod-like portion.

6. A reusable package according to claim 1, further including an insert card removably disposed between said front and rear dished portions when said front and rear body portions are in said closed position, said insert card having a foldable flap portion folded against the remainder of said insert card when disposed between said closed front and rear dished portions, and an anti-theft security member disposed between said folded flap and the remainder of said insert card when disposed between said closed front and rear dished portions.

7. A reusable package according to claim 6, wherein said remainder of said insert card and said foldable flap portion are substantially opaque, said security member being concealed from view therebetween when said foldable flap portion is folded against said remainder of said insert card.

8. A reusable package according to claim 7, wherein said insert card has product information about the display item printed thereon.

9. A reusable package according to claim 1, wherein said front and rear body portions are initially attached to each other to secure them in said closed portion with the display item disposed therebetween, said attachment being frangible in order to allow said front and rear body portions to be unfolded from each other for selective removal of the display item, said front and rear body portions having complementary dished portions formed therein, said dished portions being grippingly and releasably nestable with each other in order to releasably secure said front and rear body portions in said closed position after said frangible attachment has been broken.

10. A reusable package according to claim 1, further including at least one hang-hole extending through each of said front and rear body portions, said hang-holes being aligned with each other when said front and rear body portions are in said closed position in order to allow said package to be hung on an external protruding member.

11. A reusable package adapted for displaying, holding and storing a tool item having an elongated shank portion protruding therefrom, said package comprising a front body portion and a rear body portion each of which having inner and outer sides and being hingedly interconnected with each other in order to be selectively foldable relative to each other between a fully closed position with their respective inner sides in a generally face-to-face abutting relationship and a fully open position with their respective inner sides being separated and generally coplanar, at least said front body portion being at least partially transparent in order to allow a viewer to see the tool item therethrough when the tool item is disposed within said package, said front body portion having a blister cavity display portion formed therein and protruding generally outwardly from said inner to said outer sides thereof, said blister cavity display portion having an elongated retaining recess formed therein, said retaining recess grippingly and releasably receiving and retaining the shank portion of the tool item when the tool item is disposed within said package with the remainder of the tool item being suspended therefrom and disposed within said blister cavity display portion, said front body portion further including a front dished portion formed therein and protruding generally forwardly from said inner to said outer sides thereof, said front dished portion being larger than and generally surrounding said blister cavity display portion, said rear body portion having a rear dished portion formed therein and protruding generally forwardly when said front and rear body portions are in said closed position from said outer to said inner sides of said rear body portion, said rear dished portion being complementary in size and shape with said front dished portion, said rear dished portion being grippingly and releasably nested within said front dished portion when said front and rear body portions are in their closed position, said front and rear body portions being initially attached to each other to secure them in said closed portion with the tool item disposed therebetween, said attachment being frangible in order to allow said front and rear body portions to be unfolded from each other for selective removal of the tool item, said dished portions being grippingly and releasably nestable with each other in order to releasably secure said front and rear body portions in said closed position after said frangible attachment has been broken.

12. A reusable package according to claim 11, wherein the remainder of the tool item is out of contact with said blister cavity display portion when it is suspended from its shank portion.

13. A reusable package according to claim 11, further including at least one hang-hole extending through each of said front and rear body portions, said hang-holes being aligned with each other when said front and rear body portions are in said closed position in order to allow said package to be hung on an external protruding member.

14. A reusable package according to claim 11, further including an insert card removably disposed between said front and rear dished portions when said front and rear body portions are in said closed position, said insert card having a foldable flap portion folded against the remainder of said insert card when disposed between said closed front and rear dished portions, and an anti-theft security member disposed between said folded flap and the remainder of said insert card when disposed between said closed front and rear dished portions.

15. A reusable package according to claim 14, wherein said remainder of said insert card and said foldable flap portion are substantially opaque, said security member being concealed from view therebetween when said foldable flap portion is folded against said remainder of said insert card.

16. A reusable package according to claim 15, wherein said insert card has product information about the tool item printed thereon.

17. A reusable package according to claim 11, further including at least one hang-hole extending through each of said front and rear body portions, said hang-holes being aligned with each other when said front and rear body portions are in said closed position in order to allow said package to be hung on an external protruding member.

* * * * *

UNITED STATES PATENT AND TRADEMARK OFFICE
CERTIFICATE OF CORRECTION

PATENT NO.     : 6,152,299
DATED          : November 28, 2000
INVENTOR(S)    : Gina O'Malley et al.

Page 1 of 1

It is certified that error appears in the above-identified patent and that said Letters Patent is hereby corrected as shown below:

<u>Column 4,</u>
Line 8, "with" should be -- within --.

Signed and Sealed this

Twenty-eighth Day of May, 2002

*Attest:*

JAMES E. ROGAN
*Attesting Officer*    Director of the United States Patent and Trademark Office